March 18, 1969 G. C. BLANKE 3,433,936

ELECTRONIC INTEGRATOR

Filed Oct. 28, 1964

INVENTOR.
GORDON CLIFFORD BLANKE

BY Paul R. Harder

ATTORNEY

United States Patent Office 3,433,936

Patented Mar. 18, 1969

3,433,936

ELECTRONIC INTEGRATOR

Gordon Clifford Blanke, Whittier, Calif., assignor to Beckman Instruments, Inc., a corporation of California Filed Oct. 28, 1964, Ser. No. 407,157

U.S. Cl. 235—183 6 Claims

Int. Cl. G06g 7/18; H03k 5/00

ABSTRACT OF THE DISCLOSURE

There is disclosed a multichannel, time-shared electronic integrator capable of sorting and separately integrating a plurality of multiplexed data signals time sharing a single input terminal. A plurality of switches are utilized to demodulate or short the multiplexed data signals and connect separate ones of a plurality of storage devices between the input and output of a high gain amplifier in an integrator circuit. In this manner separate integration circuits or channels are provided for each of the data signals which may be demodulated and separately integrated. A nondestructive readout is also provided.

This application relates generally to integrating apparatus and more specifically to a plural channel, time-shared electronic integrator.

Figure 1:
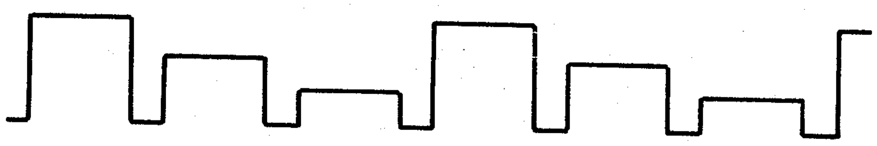

In the application of Edmund E. Buzza for Flame Photometer, Ser. No. 407,040, filed concurrently herewith and assigned to the assignee of the instant invention there is disclosed a photometric system utilizing a rotating filter wheel containing three filters having maximum transmissions at the characteristic spectral lines of three elements, for example, lithium, sodium and potassium. As the filter rotates radiant energy levels corresponding to these wavelengths impinge periodically and sequentially upon the detector with intensities dependent upon the concentrations of these elements in the particular sample. The output of the detector will then be a multiplexed electrical signal having three interlaced information or data signals. One of these data signals has an amplitude that is a function of the intensity of a dominant lithium line and thereby a function of the concentration of lithium in the sample; a second data signal has an amplitude that is a function of the intensity of a dominant sodium line and a third data signal has an amplitude that is a function of the intensity of a dominant potassium line. The sodium and potassium data signals are likewise functions of the concentrations of these elements in the particular sample. With such an arrangement and with a sample having diminishing concentrations of lithium, sodium and potassium, the radiant energy signal at the detector, and the output signal of the detector if the detector is of the so-called "fast detector" type, is illustrated in FIG. 1 in somewhat idealized form.

In the photometric system therein disclosed it is desirable to integrate each of the data signals over a period of time. One method of performing this integration is to sort the data signals by suitable switching to corresponding channels each of which includes a suitable integrating device. Such a system requires three separate and distinct integrators.

It is the object of this invention to provide a system for integrating separately a plurality of multiplexed data signals while utilizing only a single time-shared amplifier.

Another object is to provide a multichannel, time-shared electronic integrator capable of sorting and separately integrating a plurality of multiplexed data signals time sharing a single input terminal.

Figure 2:
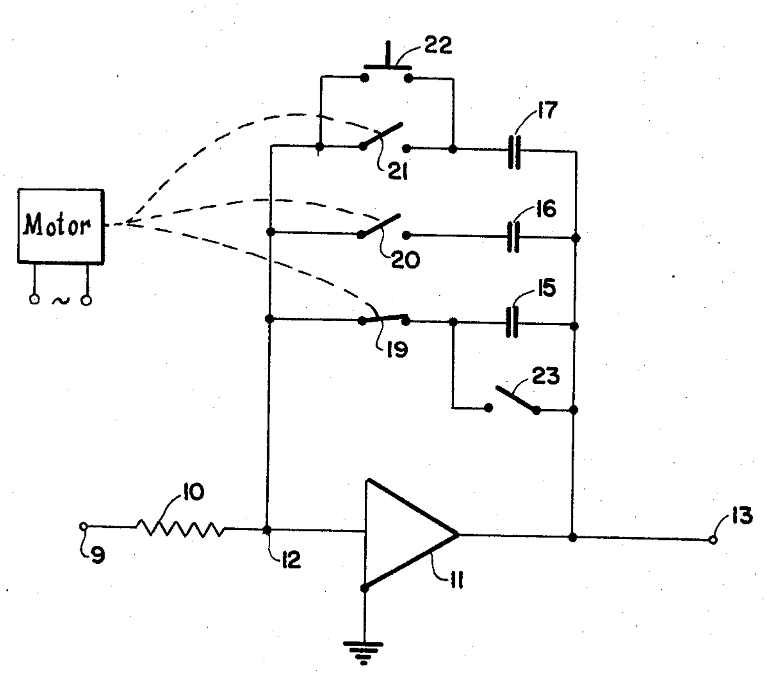

Other objects and many of the attendant advantages of this invention will become more readily apparent to those skilled in the art as the same becomes better understood by reference to the following detailed description when considered in connection with the accompanying drawing in which:

FIG. 1 is an example of a typical input to a time-shared integration circuit; and FIG. 2 is a schematic diagram of a multichannel integration circuit constructed according to the teachings of this invention.

Referring now to FIG. 2 the multichannel integration circuit may comprise an input terminal 9, a series input resistor 10 and a high gain amplifier 11 having an input terminal 12, an output terminal 13 and a common terminal which may be connected to a point of reference potential, generally circuit ground. The output terminal 13 of amplifier 11 corresponds to the output terminal of the integration circuit. A plurality of storage devices such as capacitors 15, 16 and 17, are respectively connected in negative feedback fashion by switches 19, 20 and 21 between the input and output terminals of the amplifier.

Switches 19, 20 and 21 are utilized to demodulate or sort the multiplexed data signals. Switches 19–21 are operated in synchronism with respective data signals representing particular elements, a distinct integration channel is formed for each of these data signals and the data signal, due to a single particular condition, may be integrated over any given period of time. For example, switches 19–21 may be operated by a motor 23 as more fully described hereafter and if switch 19 is closed in synchronism with the lithium data signal while switches 20 and 21 are maintained open, the lithium data signal will be integrated and stored across capacitor 15. If switch 20 is closed in synchronism with the sodium data signal, the sodium data signal will be integrated and stored across capacitor 16. Likewise, the data signal which is a function of the potassium concentration may be integrated and stored across capacitor 17 by operating switch 21 in synchronism with this signal.

It is therefore apparent that the circuit described and illustrated constitutes a multichannel, time-shared electronic integrator utilizing a single amplifier. The particular type of switch utilized forms no part of this invention and may conveniently be either electronic switches or any suitable type of mechanical commutator depending upon the particular application. In the flame photometer disclosed in the aforementioned application the switches may most conveniently be constructed of magnetic reed switches activated by a permanent magnet driven by the same motor which drives the filter disc. By such an operation variations in motor speed or phase lag do not affect the system since the switches will close and remain closed during the period of time when a particular filter is disposed in the optical beam regardless of its time duration. If the data signals are integrated over a period of time it is apparent that any error due to termination of the integration period when a different switch is closed other than the one that was closed upon initiation of the period will be relatively small. For example, in the aforementioned flame photometer, if the motor driving the filter wheel is operated at a speed of 1700 r.p.m., approximately 700 bits of information for each wavelength channel are provided during a typical integrating period and the error due to the termination of the integrating period when a different filter is positioned in the beam other than the one in the beam upon initiation of the period will only be approximately 0.14%.

Upon termination of the integration period switches 19–21 may be opened and it is generally desirable to read the values stored across each capacitor. This may be accomplished by independently closing switches 19, 20 and 21 thereby connecting the capacitor between the input and output of the amplifier. If the amplifier has negligible offset potential and the gain of the amplifier is sufficiently high, it is apparent that the potential at output terminal 13 will be that stored across the individual capacitor. It is also apparent that the arrangement illustrated herein provides a nondestructive readout of the integrated signal.

In certain circumstances utilization of switches 19–21 for readout purposes may not be convenient. If such is the case any suitable means of connecting the storage capacitors between the input and output of the amplifier may be utilized such as a manual or automatically operated switch connected in parallel with now open switches 19–21, one of which is schematically illustrated across switch 21 as normally open switch 22. Any suitable means may be provided for discharging each of the storage devices 15–17, one of which is exemplarily shown as normally open switch 23, which may be either automatically or manually operated. It is obvious that by suitable arrangement of the switches, a single switch may be utilized to discharge all of the storage devices.

While the invention has been described in most detail in connection with the flame photometric system illustrated in the aforementioned application it should be understood that the multichannel integrating circuit described herein may be utilized in any instance where multiplexed data signals are to be separately integrated over a desired period of time. These data signals need not be in the form of recurrent, sequential pulses but may be data signals recurring in any arbitrary sequence. In this case, it is only necessary to provide for suitable synchronization of the sorting switches with the recurring data signals. It is therefore, to be understood that the term multiplexed data signals as used herein is not intended to be limited to data signals which recur sequentially but may recur in an arbitrary manner. It should also be understood that as used herein the term information or data signal includes the absence of such signal or a zero signal level. It is further apparent that the number of channels may be increased or decreased depending upon the particular application.

It should, therefore, be understood that the embodiment is given by way of illustration only and that many modifications and variations are possible therein in light of the foregoing teachings without departing from the spirit and scope of the invention.

What is claimed is:

1. An integrating circuit for separately integrating multiplexed data signals comprising:
- amplifier means having an input and an output;
- a plurality of storage means at least equal to the number of multiplexed data signals;
- means periodically connecting individual ones of said plurality of storage means between said input and output of said amplifier in synchronism with respective ones of said data signals thereby to form distinct integrating channels for each of said multiplexed data signals.

2. A time-shared integrating circuit comprising:
- amplifier means;
- at least a pair of capacitors;
- means connecting said capacitors across said amplifier in an integration circuit in synchronism with respective multiplexed data input signals thereby providing a two-channel integrator time-sharing said amplifier.

3. An integrating circuit for separately integrating and storing multiplexed data signals each a function of a variable and time-sharing a single input line comprising:
- a plurality of storing means equal to the number of multiplexed data signals;
- amplifier means connected to said input lines;
- means connecting separate ones of said plurality of storage means across said amplifier in an integration circuit in synchronism with respective ones of said multiplexed data signals.

4. An integrating circuit for separately integrating at least first and second data signals periodically generated in response to first and second conditions, said data signals being generated with respect to a zero level interval comprising:
- an amplifier;
- at least first and second storage means;
- means connecting said first and second storage means across said amplifier in synchronism with said first and second data signals to form a distinct integrating channel for each of said first and second data signals whereby said first and second data signals may be separately integrated over a desired period of time.

5. An integration circuit for separately integrating multiplexed data signals comprising:
- amplifier means having an input and an output;
- a plurality of storage means at least equal to the number of multiplexed data signals;
- means periodically connecting individual ones of said plurality of storage means between said input and output of said amplifier in synchronism with respective ones of said data signals thereby to form distinct integrating channels for each of said multiplexed data signals;
- means for connecting individual ones of said plurality of storage means between said input and output of said amplifier at the end of the integration period thereby producing a signal at said amplifier output proportional to the integral of the respective data signals.

6. An integration circuit for separately integrating multiplexed data signals comprising:
- amplifier means having an input and an output;
- a plurality of storage means at least equal to the number of multiplexed data signals;
- means periodically connecting individual ones of said plurality of storage means between said input and output of said amplifier in synchronism with respective ones of said data signals thereby to form a distinct integrating channel for each of said multiplexed data signals;
- means for connecting individual ones of said plurality of storage means between said input and output of said amplifier at the end of the integration period thereby producing a signal at said amplifier output proportional to the integral of the respective data signals; and
- means for discharging the potential stored on said storage means.

References Cited

UNITED STATES PATENTS

| | | | |
|---|---|---|---|
| 3,153,202 | 10/1964 | Woolam | 330—9 |
| 3,079,086 | 2/1963 | Galli et al. | 235—193 |
| 3,151,485 | 10/1964 | Federn et al. | 328—127 X |
| 3,296,613 | 1/1967 | Andersen et al. | 235—183 X |

FOREIGN PATENTS

| | | |
|---|---|---|
| 981,149 | 1/1965 | Great Britain. |

MALCOLM A. MORRISON, *Primary Examiner.*

F. D. GRUBER, *Assistant Examiner.*

U.S. Cl. X.R.

328—127